US009043172B2

(12) United States Patent
Chen et al.

(10) Patent No.: US 9,043,172 B2
(45) Date of Patent: *May 26, 2015

(54) ESTIMATING VIRTUAL MACHINE ENERGY CONSUMPTION

(75) Inventors: Ying Chen, Beijing (CN); Li Li, Beijing (CN); Liang Liu, Beijing (CN); Hao Wang, Beijing (CN); Ying Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/596,612

(22) Filed: Aug. 28, 2012

(65) Prior Publication Data

US 2012/0323509 A1  Dec. 20, 2012

Related U.S. Application Data

(63) Continuation of application No. 13/456,776, filed on Apr. 26, 2012.

(30) Foreign Application Priority Data

Apr. 29, 2011  (CN) .......................... 2011 1 0115875

(51) Int. Cl.
*G01R 21/00* (2006.01)
*G06F 9/455* (2006.01)
*G06F 1/00* (2006.01)
(Continued)

(52) U.S. Cl.
CPC . *G06F 1/28* (2013.01); *G06F 19/00* (2013.01)

(58) Field of Classification Search
USPC ......... 702/60–62, 81, 84, 127, 182, 186, 189; 718/1, 104; 713/320–321, 330, 340; 709/223–224, 226; 700/286, 291, 295, 700/297; 345/501
See application file for complete search history.

(56) References Cited

U.S. PATENT DOCUMENTS 7,134,029 B2  11/2006  Hepner
7,225,441 B2   5/2007  Kozuch et al.
(Continued)

FOREIGN PATENT DOCUMENTS

WO  WO 2010/057775 A3    5/2010
WO  WO 2010057775 A3 *  8/2010

OTHER PUBLICATIONS

Stoess et al., Energy Management for Hypervisor-Based Virtual Machines, 2007 USENIX Annual Technical Conference, 14 pp.*
Krishnan et al., VM Power Metering: Feasibility and Challenges, 2010, Sigmetrics, vol. 38, Issue 3, pp. 56-60.*
Abstract of Krishnan et al., 2010, CiteSeer, 1 pp.*
(Continued)

*Primary Examiner* — Toan Le
(74) *Attorney, Agent, or Firm* — Derek S. Jennings; Patent Mining Works, LLC

(57) ABSTRACT

A method and apparatus for estimating virtual machine energy consumption, and in particular, a method and apparatus for estimating virtual machine energy consumption in a computer system. The method includes: obtaining system energy consumption of the system hardware resources; obtaining event information of a plurality of functional units into which the system hardware resources are divided, and mapping the event information to the respective virtual machines; and calculating energy consumption of the virtual machines according to a plurality of energy consumption coefficients corresponding to the plurality of functional units and according to the event information mapped to the functional units of the respective virtual machines.

9 Claims, 14 Drawing Sheets

(51) Int. Cl.
*G06F 1/28* (2006.01)
*G06F 19/00* (2011.01)

(56) References Cited

U.S. PATENT DOCUMENTS

| | | |
|---|---|---|
| 2005/0102539 A1 | 5/2005 | Hepner |
| 2007/0112999 A1 | 5/2007 | Oney et al. |
| 2008/0301473 A1 | 12/2008 | Perez et al. |
| 2009/0204826 A1 | 8/2009 | Cox et al. |
| 2009/0293022 A1 | 11/2009 | Fries |
| 2010/0011227 A1 | 1/2010 | Govindan et al. |
| 2010/0070784 A1 | 3/2010 | Gupta |
| 2010/0192149 A1 | 7/2010 | Lathrop et al. |
| 2011/0213997 A1* | 9/2011 | Kansal et al. ............ 713/324 |
| 2012/0239323 A1* | 9/2012 | McGrane et al. ............ 702/62 |
| 2012/0296585 A1* | 11/2012 | Chen et al. ............ 702/61 |

OTHER PUBLICATIONS

Abstract of Krishnan et al., 2010, ACM Digital Library, 2 pp.*
Seo et al., An Energy Consumption Framework for Distributed Java-Based Systems, Nov. 5-9, 2007, ASE '07, Atlanta, Georgia, 4 pp.*
Seo, Malek and MEDVIDOViC, An Energy Consumption Framework for Distributed Java-Based Systems, ASE'07, Nov. 5-9, 2007, Atlanta, Georgia, USA.
Stoess, Lang and Bellosa, Energy Management for Hypervisor-Based Virtual Machines, System Architecture Group, University of Karlsruhe, Germany, 2007.
Krishman, Amur, Gavrilovska and Schwan, VM Power Metering: Feasibility and Challenges, Center for Experimental Research in Computer Systems (CERCS) Georgia Institute of Technology, Atlanta, Georgia, USA, 2010.

* cited by examiner

ESTIMATING VIRTUAL MACHINE ENERGY CONSUMPTION

CROSS REFERENCE TO RELATED APPLICATION

This application is a continuation of and claims priority from U.S. application Ser. No. 13/456,776 filed on Apr. 26, 2012, which in turn claims priority under 35 U.S.C. 119 from Chinese patent application number 201110115875.2 filed Apr. 29, 2011, the entire contents of both applications are incorporated herein by reference.

BACKGROUND OF THE INVENTION

1. Field of the Invention

The present invention relates to estimation of virtual machine energy consumption, and more specifically, to a method and apparatus for estimating virtual machine energy consumption with improved accuracy.

2. Description of Related Art

Energy consumption is an important factor in computer system management. However, Virtual Machine (VM) energy consumption cannot be metered directly.

In the prior art there exist a plurality of approaches to estimating virtual machine energy consumption, such as dividing energy consumption of an overall system by the number of virtual machines to estimate energy consumption of a single virtual machine, or a CPU runtime-based technical solution of estimating virtual machine energy consumption, i.e., the time since a VM instance is launched until it is terminated, for example, Amazon EC2 adopts such an approach.

Existing methods of estimating based on a CPU single factor are relatively coarse. Therefore, in the prior art estimation of energy consumption is less accurate, and there is room for improvement.

SUMMARY OF THE INVENTION

According to one aspect of the present invention, a method of estimating virtual machine energy consumption in a computer system, where the computer system includes system hardware resources and a plurality of virtual machines, includes the steps of: obtaining system energy consumption of the system hardware resources; obtaining event information of a plurality of functional units into which the system hardware resources are divided, and mapping the event information to the respective virtual machines; and calculating energy consumption of the virtual machines according to a plurality of energy consumption coefficients corresponding to the plurality of functional units and according to the mapped event information.

According to another aspect of the present invention, a system for estimating virtual machine energy consumption in a computer system, where the computer system includes system hardware resources and a plurality of virtual machines, includes: a system energy consumption component configured to obtain system energy consumption of the system hardware resources; a functional unit event reading component configured to obtain event information of a plurality of functional units into which the system hardware resources are divided, and map the event information to the respective virtual machines; and a virtual machine energy consumption calculating component configured to calculate energy consumption of the virtual machines according to a plurality of energy consumption coefficients corresponding to the plurality of functional units and according to the mapped event information.

According to still another aspect of the present invention, a computer readable storage medium tangibly embodies computer readable program code having computer readable instructions. When the instructions are implemented by a computer that comprises system hardware resources and a plurality of virtual machines, they carry out the steps of a method of estimating virtual machine energy consumption. The method includes: obtaining system energy consumption of the system hardware resources; obtaining event information of a plurality of functional units into which the system hardware resources are divided, and mapping the event information to the respective virtual machines; and calculating energy consumption of the virtual machines according to a plurality of energy consumption coefficients corresponding to the plurality of functional units and according to the mapped event information.

BRIEF DESCRIPTION OF THE DRAWINGS

Inventive features regarded as characteristics of the present invention are set forth in the appended claims. However, the present invention itself, its preferred embodiments, objects, features, and advantages will be better understood from the following detailed description of illustrative embodiments, when taken in conjunction with the accompanying drawings, wherein:

DETAILED DESCRIPTION OF THE PREFERRED EMBODIMENT

Hereinafter, reference is made to the figures to describe embodiments of the present invention. Many details are explained in the following description for a more comprehensive understanding of the present invention. However, those skilled in the art would readily appreciate that the present invention may be implemented without some of these details and the present invention is not limited to specific embodiments to be described. On the contrary, any combinations of the following features and elements may be considered to implement the present invention, no matter whether they relate to different embodiments. Therefore, the following aspects, features, embodiments, and advantages are only for illustration and should not be regarded as elements or limitations of the appended claims, unless otherwise specified in the claims explicitly.

Figure 1:
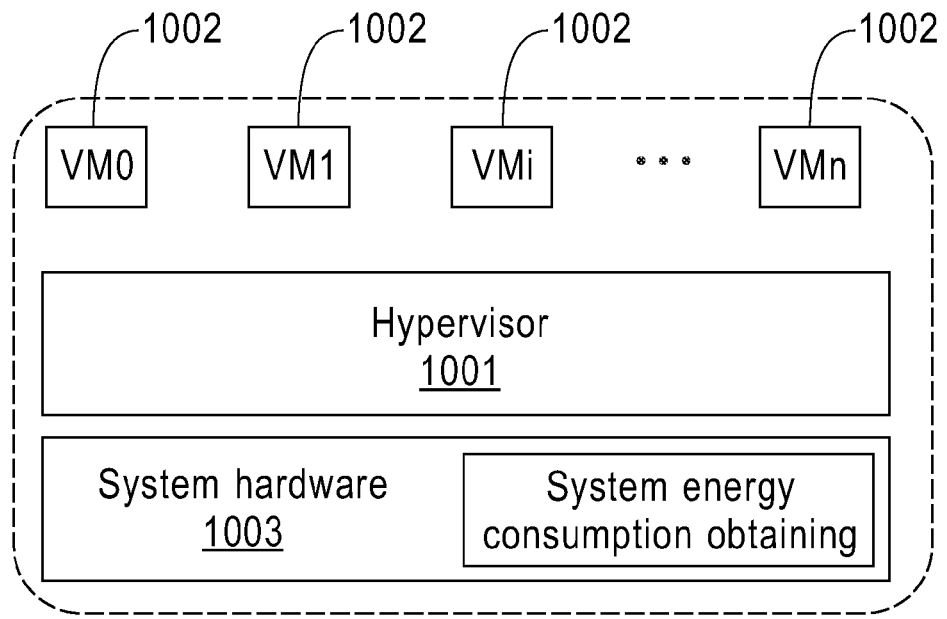
FIG. 1 is a schematic view of a computer system for estimating virtual machine energy consumption.

Now refer to FIG. 1, which illustrates a computer system in which estimation of virtual machine energy consumption may be implemented. As illustrated in this figure, the computer system at least includes: a hypervisor 1001 that is an intermediate software layer running between system hardware and an operating system and that may allow a plurality of virtual machines 1002 to share system hardware resources 1003, wherein the hypervisor 1001 may also be referred to as a Virtual Machine Monitor (VMM), with the hypervisor it is possible to hide actual physical properties of a specific computing platform and provide an abstract, unified, simulated computing environment for users, i.e., virtual machines 1002, there are a plurality of virtual machines in FIG. 1, and an operating system that is running in a virtual machine is referred to as a Guest Operating System (Guest OS). In FIG. 1 the system hardware resources 1003 are hardware resources managed by the hypervisor, and may be embodied as a host system, a computer cluster, one or more computing nodes in a cloud computing environment, or any other forms.

Further description is presented below of a method of estimating energy consumption of respective virtual machines in the computer system illustrated in FIG. 1 based on statistics of functional unit events.

Figure 2:
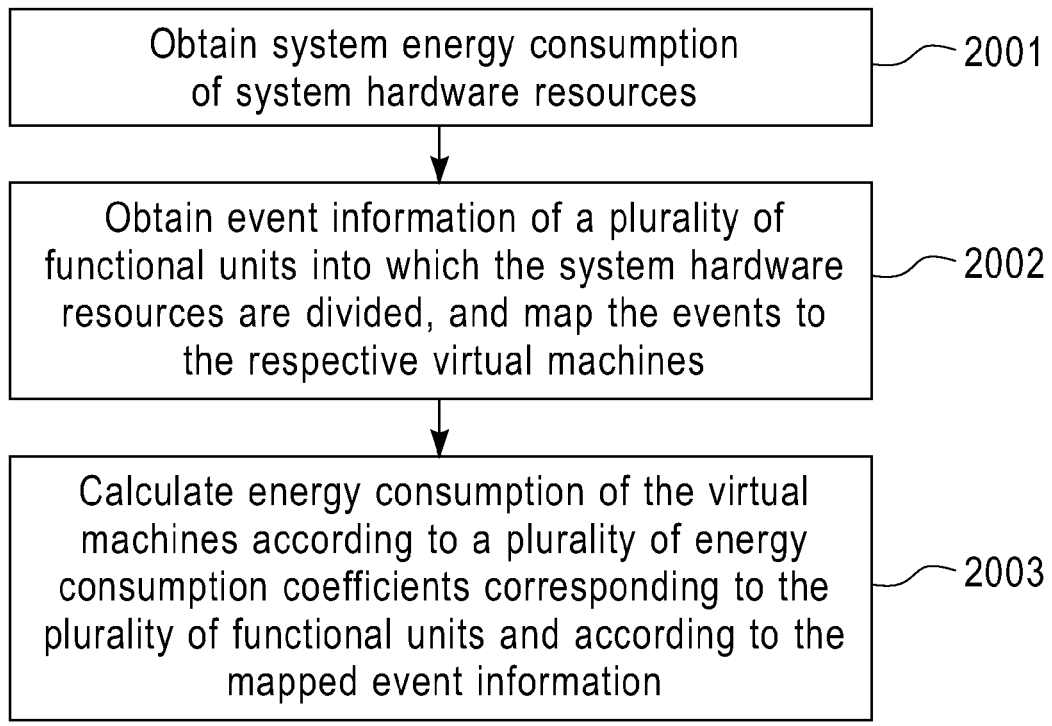
FIG. 2 is a flowchart of a method for estimating virtual machine energy consumption.

FIG. 2 is a flowchart of a method of estimating virtual machine energy consumption. As illustrated in this figure, the method includes the following steps:

Step 2001: obtain system energy consumption of the system hardware resources. Those skilled in the art may use an existing approach to directly or indirectly meter the system energy consumption, and details thereof are omitted here.

Step 2002: obtain event information of a plurality of functional units into which the system hardware resources are divided, and map the event information to the respective virtual machines.

Both the system hardware resources 1003 and the virtual machines 1002 are divided in the same manner into a plurality of functional units, such as CPU, Memory (access device), I/O, and the like. The Memory may include any type of access device, such as a memory access device or a hard disk access device; the I/O unit may include any type of input/output device, such as a block device I/O, a network device transmitting and receiving units, etc. Those skilled in the art may obtain a plurality of functional units through any combinations on this basis. In order to further improve the accuracy of energy consumption estimation, the plurality of functional units may select a main energy-consuming unit from the system hardware resources. In a preferred embodiment, the plurality of functional units at least includes a CPU and then may further include one or more other main energy-consuming functional units, such as Memory or I/O. When determining the main energy-consuming functional units, reference may be made to energy consumption statistical values of respective components in a typical server shown in Table 1, or those skilled in the art may set energy consumption weights of respective functional units according to their experience.

TABLE 1

| Component | Peak Power (Watt) |
| --- | --- |
| CPU | 80 |
| Memory Access Device | 36 |
| Hard Disk | 12 |
| Peripheral Interface | 50 |
| Main Board | 25 |
| Fan | 10 |
| Power Supply Unit Loss | 38 |
| Total | 251 |

Event information of the functional units is lower level execution information in the computer system and may be used for higher level analysis application. In one embodiment, event information of the functional units is event information from hardware performance monitor (HPM), such as hardware event counts of CPU and Memory. A processor of any current architecture may provide HPM, and HPM monitors performance of an application at the architecture level by a series of special-purpose hardware registers.

Event information of the functional units may further be I/O throughput information, such as throughput information of a block device and a network device. For I/O throughput information, it is possible to, in response to a request for or a response to the I/O, read throughput data of the I/O request or the I/O response and obtain a virtual machine corresponding to the request or the response by mapping according to identification information in collected information of the I/O request or the I/O response.

Step 2003: calculate energy consumption of the virtual machines according to a plurality of energy consumption coefficients corresponding to the plurality of functional units and according to the mapped event information.

Each functional unit has a corresponding energy consumption coefficient that reflects energy consumption corresponding to a unit event. Hence, energy consumption of the respective virtual machines can be estimated according the energy consumption coefficients and the event information mapped to the respective virtual machines. The energy consumption coefficient may be obtained based on a predetermined energy consumption weight or calculated according to the system energy consumption and the event information mapped to the respective virtual machines.

Figure 3:
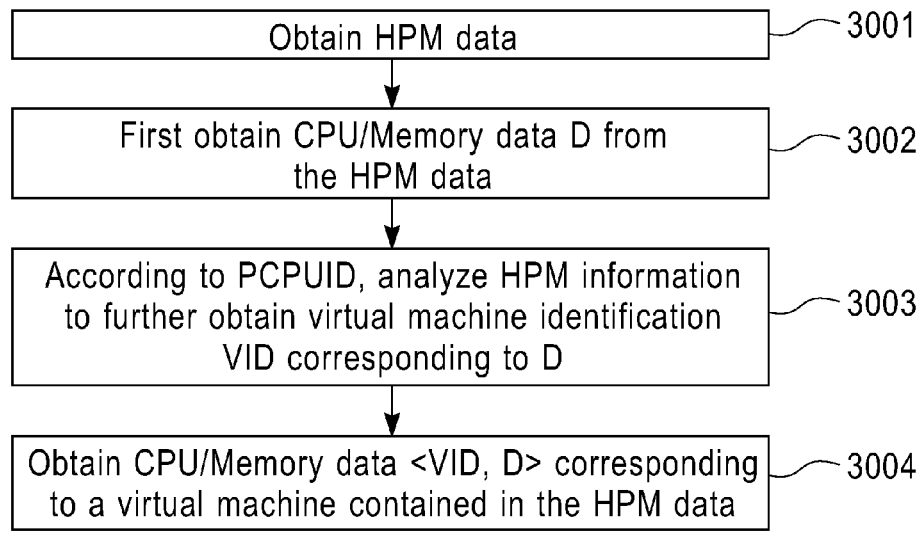
FIG. 3 illustrates a concrete flow according to one embodiment of the present invention.
Figure 4:
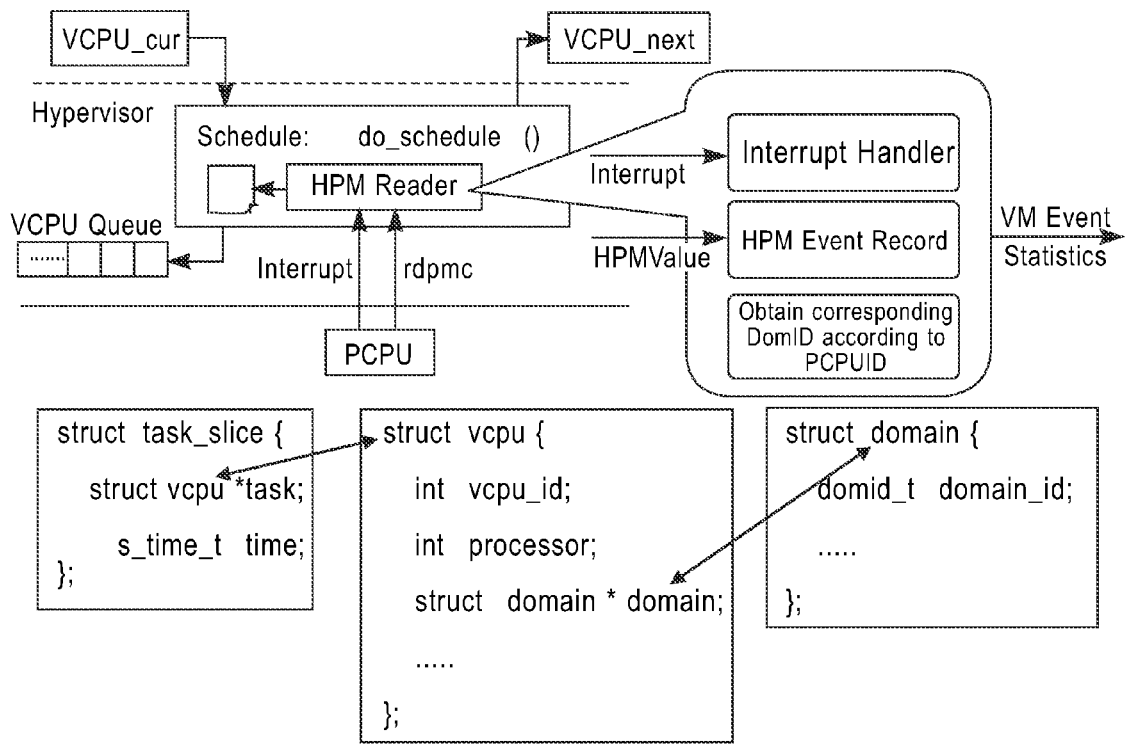
FIG. 4 is a schematic view of collecting virtual machine HPM events in one embodiment.

FIGS. 3 and 4 illustrate an execution procedure of step 2002 by taking HPM for example. For a method of collecting information of every virtual machine, when a virtual machine processor (VCPU) is scheduled, HPM event information is read, and the read HPM information is mapped to information classified according to virtual machines.

FIG. 3 illustrates one embodiment of obtaining event information of functional units of the system hardware resources in the above step 2002. When the virtual machine processor (VCPU) is scheduled, interruption is produced, and as illustrated in this figure HPM data is obtained in sub-step 3001; in sub-step 3002, CPU/Memory data D is first obtained from the HPM data; in sub-step 3003, according to physical CPU ID (PCPUID), the HPM information is analyzed to further obtain virtual machine identification VID corresponding to D; in sub-step 3004, CPU/Memory data <VID, D> corresponding to a virtual machine and contained in the HPM data is obtained.

However, concrete implementations might vary with different CPU architectures and hypervisors. Referring to FIG. 4, which further explains the flow of FIG. 3 by way of example, when the VCPU is scheduled, i.e., Scheduler: do_schedule( ) is run, interruption is produced, and HPM data of an HPM register may be obtained at the same time. According to physical CPU (PCPU) ID during scheduling, HPM data corresponding to a virtual machine whose ID is DomID is obtained by mapping. The scheduler includes a next running VM and the size of a running slice by a structure, namely, task_slice and a schedule core interface. When the schedule core needs to schedule a virtual machine, it will query a current scheduler, and the scheduler returns such a structure to determine next virtual machine to be scheduled and run As an optional step, an HPM control register may be configured to manually or automatically identify and temporarily store processor architecture information of online CPU. By configuring the HPM register, CPU or Memory related events may be collected according to the CPU architecture information; processors with different architectures may monitor different numbers of HPM events and lists, and a threshold value may be specified such that a hardware counter increases when the events exceed the threshold value. For example, in the embodiment illustrated in FIG. 12, the following information may be configured at the hypervisor boot time:
  i. CPU_Type: 1
  ii. HPM_Num: 2
  iii. HPM0_Evt: CPU run cycle
  iv. HPM0_Config: 0x01
  v. HPM0_Threshold: 10000
  vi. HPM1_Evt: Mem access
  vii. HPM1_Config:0x02
  viii. HPM1_Threshold: 1000

It is possible to configure the number of HPM events HPM_ Num on which statistics need to be made, a list of hardware events HPM0_Evt: CPU run cycle, and HPM1_Evt: Mem access. A threshold value HPM0_Threshold is further included. In one embodiment, configuration may be implemented by applying a write model related register (WRMSR). WRMSR writes the content of a register EDX:EAX to a 64-bit Model Specific Register (MSR) specified by a register ECX.

As an optional step, the HPM control register may be further used for controlling the HPM event collecting process or starting/stopping HPM data counting at the virtual machine runtime; the HPM control register may be reconfigured according to CPU architecture information, and the HPM control register needs to be reconfigured under control especially when virtual machine migration occurs.

In one embodiment, when virtual machine slice switching occurs, underlying hardware may automatically upload interruption information to the hypervisor, and a read performance monitoring counter (RDPMC) may be used to obtain hardware performance statistical information. RDPMC is used for loading a current counter value from a selected counter to the register EDX:EAX. Hence, in this embodiment, the HPM event for performance monitoring and counting may be read by RDPMC instructions, and an event monitoring counter is read to EDX:EAX according to the specification of ECX. Then, event information of the functional units is obtained and mapped to the respective virtual machines. For example, the following exemplary lines of mapping information may be obtained with reference to FIG. 12.
  i. VM_ID: VM0
  ii. HPM0_Val: 56000
  iii. HPM1_Val: 3200
  iv. VM_ID: VM1
  v. HPM0_Val: 47000
  vi. HPM1_Val: 1400
  vii. VM_ID: VM2
  viii. HPM0_Val: 78000
  ix. HPM1_Val: 3800

Figure 5:
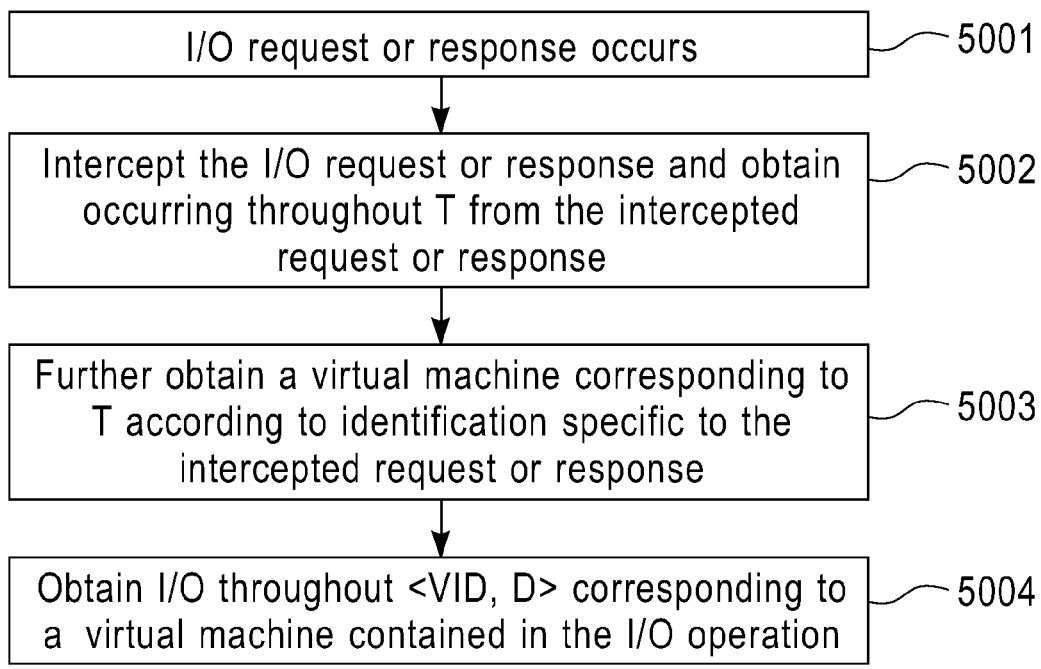
FIG. 5 is a flowchart of a method of obtaining virtual machine I/O throughput data.

FIGS. 5 and 6 illustrate an execution procedure of step 2002 by taking I/O throughput information for example.

FIG. 5 is a flowchart of collecting data throughput of an I/O device, for reading throughput data of the request or response at the virtual machine runtime, and obtaining a virtual machine identification corresponding to the request or response by mapping according to specific identification information in the collected request or response information. As illustrated in this figure, in step 5001, an I/O request or response occurs; in step 5002, the I/O request or response is intercepted, and incurred throughput T is obtained from the intercepted request or response; in step 5003, a virtual machine corresponding to T is further obtained according to an identification specific to the intercepted request or response; in step 5004, I/O throughput <VID, D> corresponding to the virtual machine involved in the I/O operation is obtained.

Figure 6A:
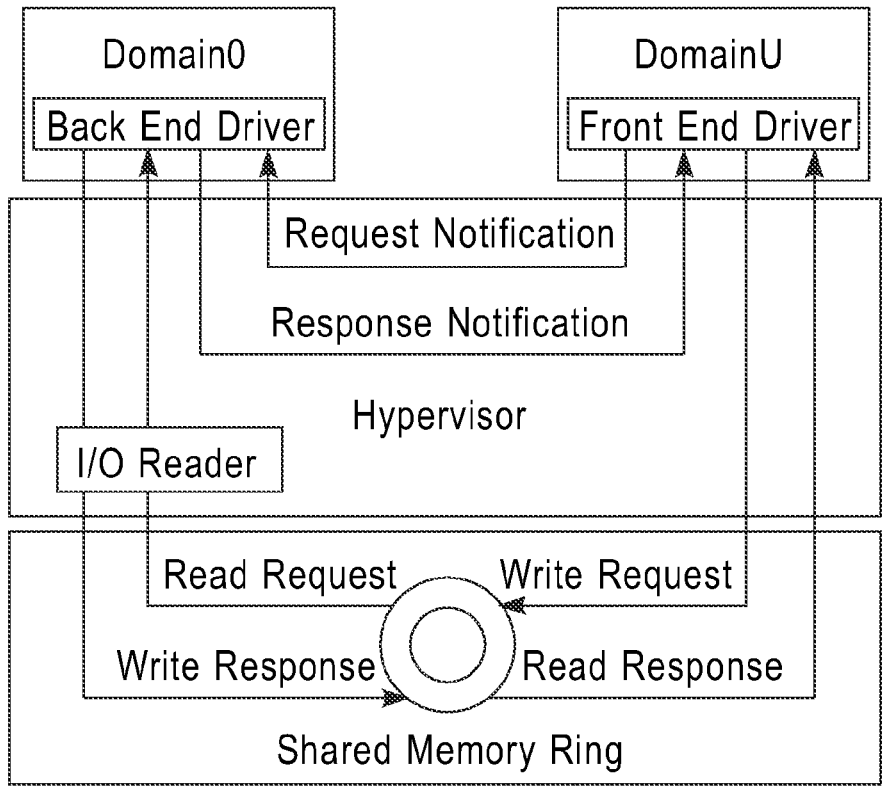
FIG. 6A is a schematic view of collecting block device I/O throughput information in one embodiment.
Figure 6B:
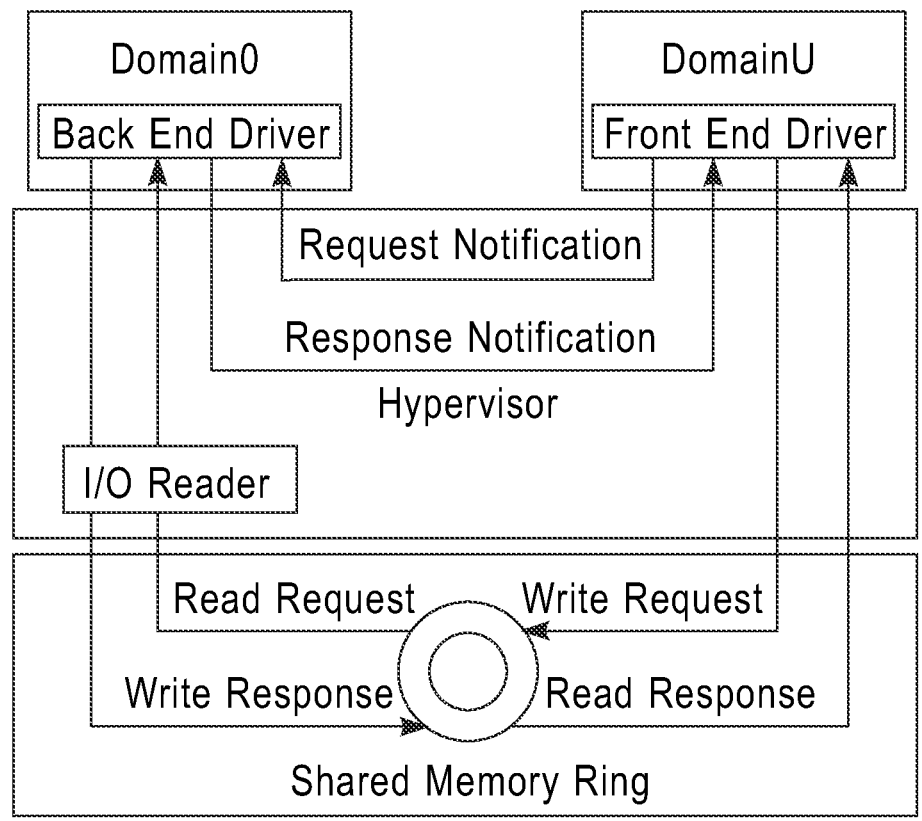
FIG. 6B is a schematic view of collecting network transmitting and receiving devices I/O throughput information in one embodiment.
Figure 6C:
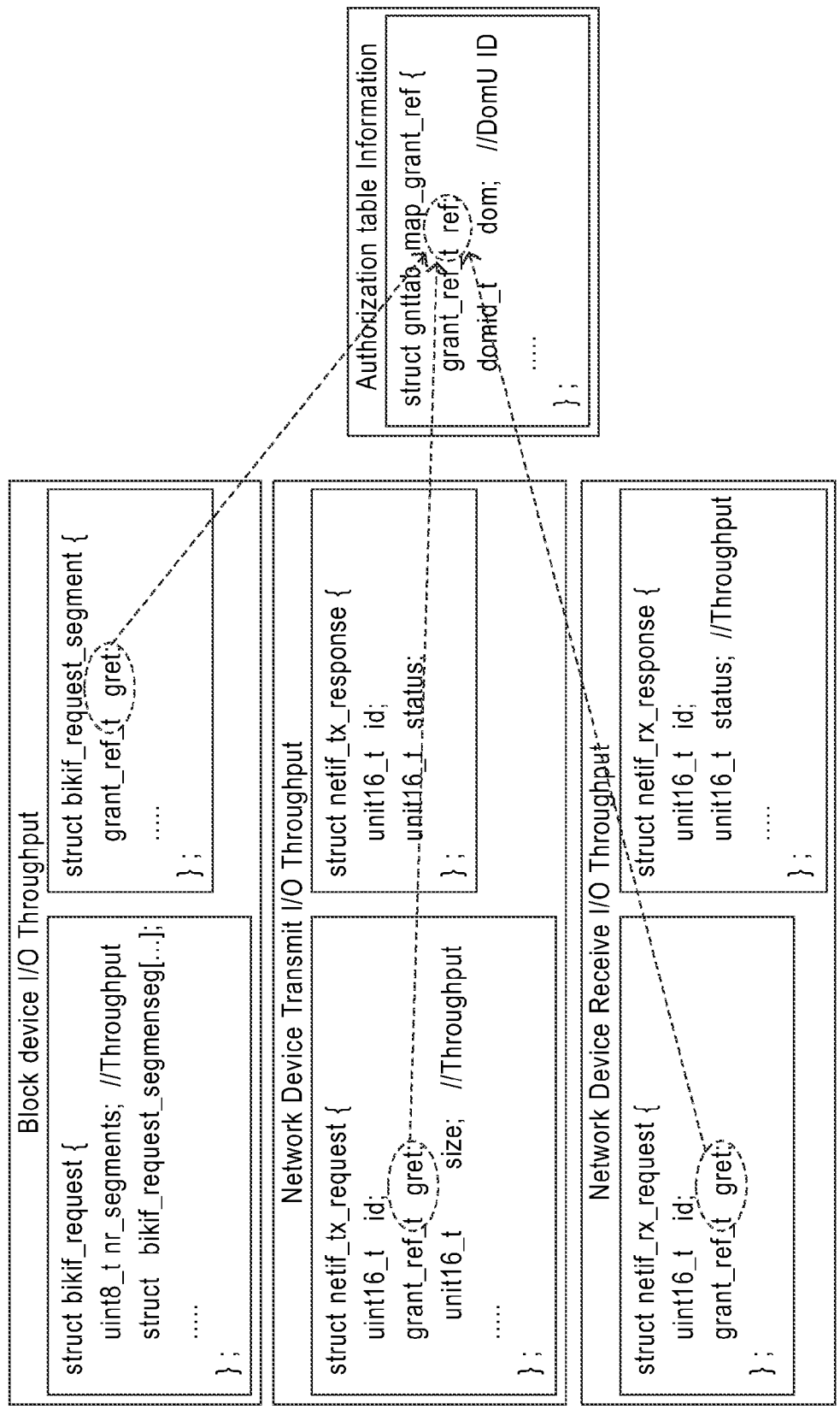
FIG. 6C is a schematic view of collecting virtual machine I/O throughput information in one embodiment.

FIGS. 6A, 6B, and 6C illustrate a method of collecting I/O throughput information by taking Xen for example. Xen of Citrix is a para-virtualization server virtualization method, and there is also Hyper-V of Microsoft. A plurality of virtual machines (virtual machines or guest OSes, wherein the gust OS represents a guest operating system) are running on virtualization software, and besides, a managing VM (referred to as Domain0 in Xen of Citrix, and referred to as the Parent Partition in Microsoft Hyper-V) is running thereon. However, virtual machines are referred to as DomU in Cirtix Xen and referred to as Child Partitions in Microsoft Hyper-V. Domain0 manages all input/output device drivers on an entire hardware platform, and includes therein all the input/output device drivers on the platform. In other words, a para-virtualization method does not emulate device drivers in the hypervisor but emulates CPU and Memory; a virtual machine itself is not provided with a device driver and needs assistance of the managing OS. Hence, in Xen I/O throughput event information may be obtained with the assistance of Domain0.

As illustrated in FIGS. 6A and 6B, Domain0 is a special one which is provided with a device driver like a network card having interaction with an actual device, and such a driver is referred to as a back end driver. In a user domain referred to as DomainU (DomU) there is a corresponding front end driver, which is an interface of a virtual device. For communication with an actual device, in DomU the front end driver needs to be connected with the back end driver and interacts information by Request Notification or Response Notification. A memory page is shared between the two domains, a shared memory ring is arranged in the memory page by Domain0 and DomainU, an event channel is arranged for the shared ring via which some information is delivered between Dom0 and DomU; these messages (requests or responses) will be intercepted by an I/O reader.

As illustrated in FIG. 6C, Xen provides grant tables for the memory shared between domains, and a device driver works using the grant tables. Each domain has its own grant table and shares it with Xen. Entries in the table are identified by grant references. Grant references are delivered between domains, and a referenced shared page is pointed by a grant table. Hence, in this embodiment a virtual machine ID corresponding to throughput of the current I/O operation may be obtained by an identification ref of a grant reference table.

For a full-virtualization server virtualization method like ESX of VMware, ESX emulates all input/output devices on a hardware platform, so within ESX are contained all these device drivers and a virtual machine does not need to obtain device driver services from the managing VM. Hence, it is apparent to those skilled in the art that throughput information of I/O data may be obtained by a hardware performance monitor.

Step 2003 is further illustrated with reference to FIGS. 7 and 8, and various embodiments are provided to illustrate how to calculate energy consumption of the respective virtual machines according to a plurality of energy consumption coefficients corresponding to the plurality of functional units and the event information mapped to the functional units of the respective virtual machines.

Each functional unit has a corresponding energy consumption coefficient which reflects energy consumption corresponding to a unit event. Hence, energy consumption of the respective virtual machines may be estimated according to the event information mapped to the respective virtual machines and the energy consumption coefficients. The energy consumption coefficients may be obtained based on predetermined energy consumption weights or calculated according to the system energy consumption and the event information mapped to the respective virtual machines.

$$VM(i)\text{energy consumption}=a*Xi+b*Yi+c*Zi+f(d) \qquad \text{formula (1)}$$

Supposing there is a total of n virtual machines in the computer system, in a specific embodiment, energy consumption of the $i^{th}$ virtual machine may be calculated according to formula (1), wherein a, b, and c are energy consumption parameters, i.e., energy consumption corresponding to each functional unit event, and this virtual machine may be divided into three functional units, namely CPU, Memory, I/O. Optionally, functional units whose event information has not been obtained are further included, and energy consumptions of the functional units whose event information has not been obtained is allocated among the virtual machines in the step of calculating energy consumption of the virtual machines. The functional units whose event information has not been obtained are the remaining portion other than functional units resulted from the dividing step. Those skilled in the art may adopt various embodiments, for example, including functional units whose event information cannot be obtained, such as a power supply and a fan, or including functional units whose event information can be obtained but is not obtained due to relatively low energy consumption. Hence, parameter d is energy consumption of the remaining portion other than functional units resulted from the dividing step, f(d) represents that the energy consumption d of the remaining portion may be allocated among the plurality of virtual machines in a certain manner, for example, equally sharing d among the respective virtual machines according to formula (1). Of course, those skilled in the art may allocate d in other manners, for example, allocating d by taking login times of the respective virtual machines as weights.

$Xi$ is a statistical value of CPU-related HPM events mapped to the $i^{th}$ virtual machine; $Yi$ is a statistical value of Memory-related HPM events mapped to the $i^{th}$ virtual machine; $Zi$ is a statistical value of I/O throughput-related events mapped to the $i^{th}$ virtual machine; and f(d) is allocated energy consumption of the remaining portion.

$$a*X\text{sum}+b*Y\text{sum}+c*Z\text{sum}+d=E \qquad \text{formula (2)}$$

For the entire computer system, formula (2) reflects a relationship among energy consumption coefficients, functional unit events, and system energy consumption. E reflects energy consumption of the whole system hardware resources; Xsum is a sum of all Xis in n virtual machines, and in the above specific embodiment, it reflects a sum of CPU-related HPM events; Ysum is a sum of all Yis in n virtual machines, and in the above specific embodiment, it reflects a sum of Memory-related HPM events; Zsum is a sum of all Zis in n virtual machines, and in the above specific embodiment, it reflects a sum of I/O throughput-related events. Optionally, parameter d may further be included.

Figure 7:
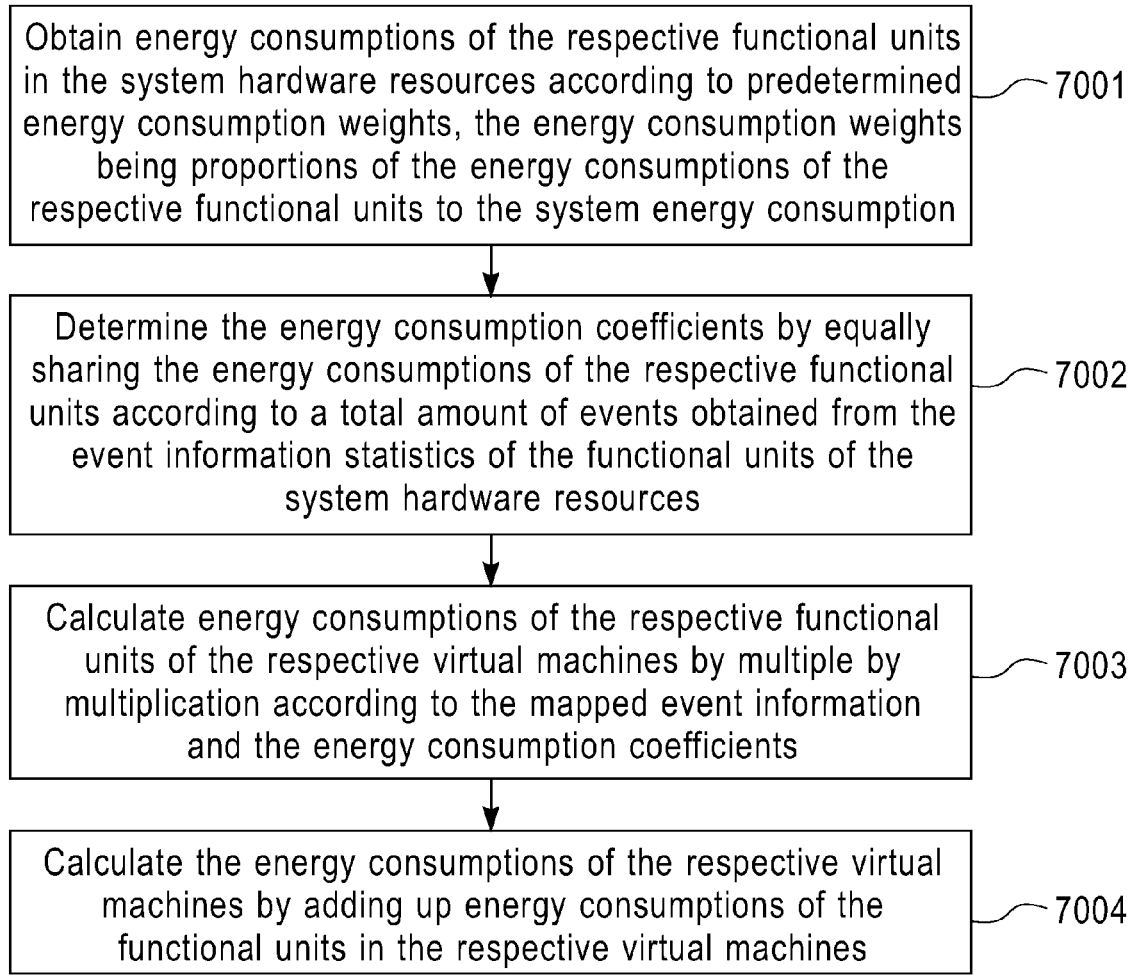
FIG. 7 illustrates a first embodiment of calculating virtual machine energy consumption according to energy consumption coefficients in the present invention.

FIG. 7 is one embodiment of calculating virtual machine energy consumption according to energy consumption weights of functional units, which calculates energy consumption of the respective virtual machines according to a plurality of energy consumption coefficients corresponding to the plurality of functional units and according to the event information mapped to the functional units of the respective virtual machines.

In sub-step 7001, energy consumptions of the respective functional units are obtained according to predetermined energy consumption weights, the energy consumption weights being proportions of the energy consumptions of the respective functional units to the system energy consumption.

In one embodiment, the predetermined energy consumption weights are a set of data, i.e., a set of fixed energy consumption weights. Referring to Table 1, which is a statistical table of energy consumption of respective functional units in an exemplary server, energy consumption weights may be determined on this basis. Of course, those skilled in the art may select different energy consumption weights based on empirical data, which does not affect the implementation of the present application.

In another improved embodiment, the predetermined energy consumption weights are multiple sets of data, and each set of the energy consumption weights has a corresponding CPU utilization rate. In the step of calculating energy consumption of the respective functional unit according to predetermined energy consumption weights, the energy consumption weights are retrieved according to a CPU utilization rate of the system hardware resources.

Figure 8:
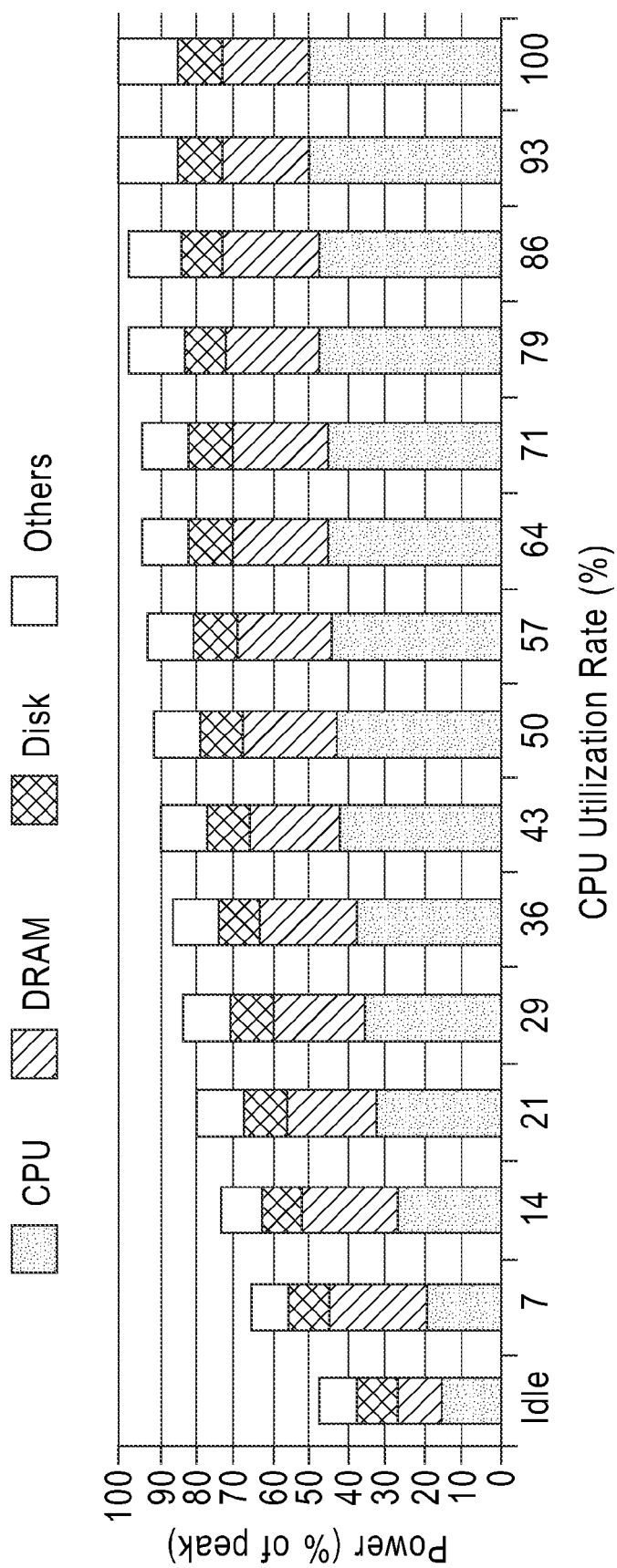
FIG. 8 is a schematic view of computer system energy consumption weights under different CPU loads.

By referring to FIG. 8, CPU utilization rates correspond to different energy consumption weights in a procedure from an idle state to full usage. Hence, a set of predetermined energy consumption weights corresponding to a CPU utilization rate may be read according to calculated loads, so that energy consumption weights may be dynamically adjusted and the estimation precision may be further increased. It should be noted specially that FIG. 8 is merely exemplary illustration and not limiting the present application. Based on the information, those skilled in the art may apply different CPU utilization rates and corresponding energy consumption weights according to states of concrete system hardware resources.

In sub-step 7002, the energy consumption coefficients are determined by equally sharing the energy consumptions of the respective functional units according to a total amount of events obtained from the event information statistics of the functional units of the system hardware resources. Since $a*XDi=E*A*XDi/X\text{sum}$, a relationship between the energy consumption coefficients and the predetermined energy consumption weights is a=E*A/Xsum, and other parameters are calculated likewise.

In sub-step 7003, energy consumption of the respective functional units of the respective virtual machines is calculated by multiplication according to the energy consumption coefficients and the event information mapped to the respective virtual machines, i.e., E*A*Xi/Xsum, E*b*Yi/Ysum, E*c*Zi/Zsum, d/n.

In sub-step 7004, energy consumption of the respective virtual machines is calculated by adding up the energy consumptions of the functional units in the respective virtual machines.

$$VM(i) \text{energy consumption} = E*A*Xi/X\text{sum} + E*b*Yi/Y\text{sum} + E*c*Zi/Z\text{sum} + d/n.$$

Figure 9:
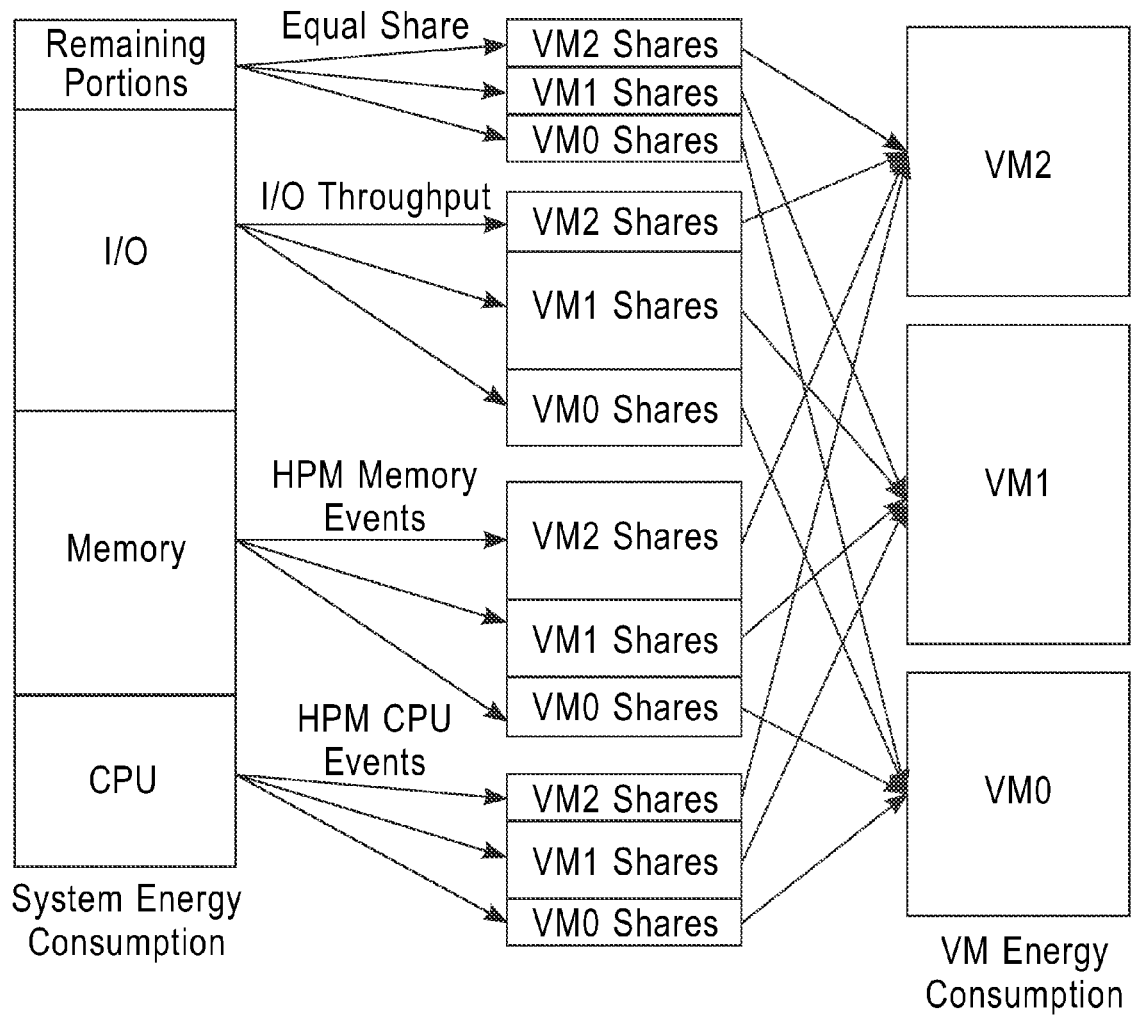
FIG. 9 illustrates a mapping relationship view of determining virtual machine energy consumption according to energy consumption weights.

This embodiment may be reflected as the establishment of an energy consumption relationship mapping. FIG. 9 is a schematic view of an energy consumption mapping relationship, wherein a first mapping is performed on energy consumption of the computer system according to energy consumption weights of the respective functional units, then the functional unit events are mapped to the respective virtual machines, and finally a second mapping is performed on energy consumption of the respective main functional units with reference to event shares of the respective main functional units. Obviously this approach is essentially a procedure of obtaining energy consumption corresponding to a functional unit event, which still the aforesaid method of calculating energy consumption of the respective virtual machines according to the plurality of energy consumption coefficients corresponding to the plurality of functional units and according to the event information mapped to the functional units of the respective virtual machines.

Figure 10:
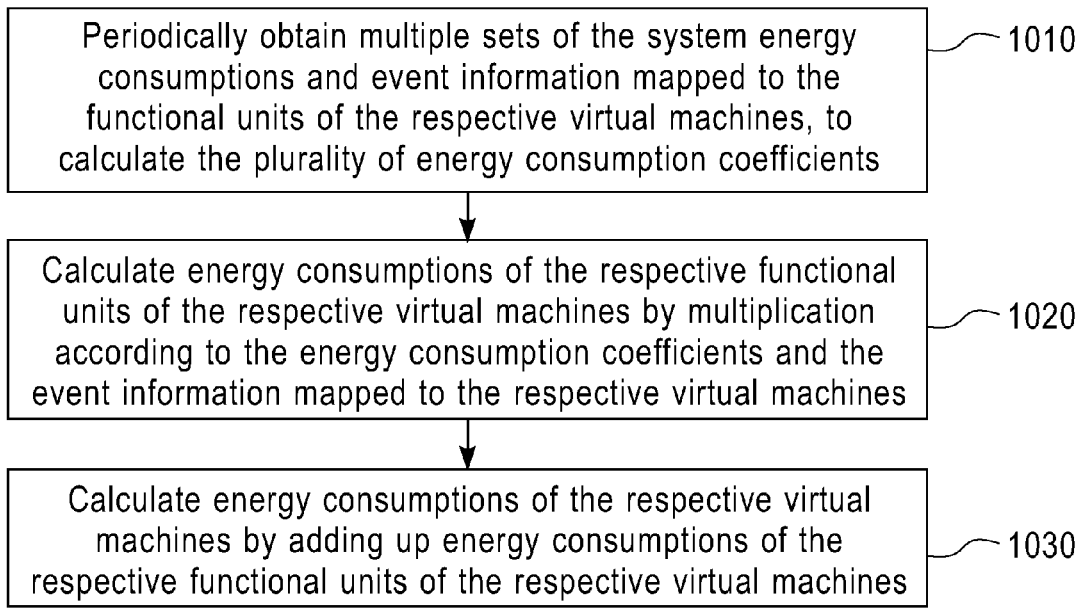
FIG. 10 illustrates a second embodiment of calculating virtual machine energy consumption according to energy consumption coefficients in the present invention.

FIG. 10 is a second embodiment of calculating virtual machine energy consumption according to energy consumption coefficients in the present invention.

In step 1010, multiple sets of the system energy consumptions and event information mapped to the functional units of the respective virtual machines are periodically obtained, and further the plurality of energy consumption coefficients are calculated. Referring to the embodiment illustrated by formula (1), since values of the four parameters, namely Xsum, Ysum, Zsum, and E, are values that can be metered, data in four periods may be collected according to a certain period. Further, an equation may be established to solve values of the four parameters, namely a, b, c, and d, wherein d is an optional parameter. Since there are four location parameters in the embodiment demonstrated in formula (1), data in four periods needs to be obtained in order to solve the equation. Those skilled in the art would readily appreciate that if another approach is used for division of functional units, data of how may periods to be obtained is determined according to the specific number of unknown parameters, so as to solve the equation. As further improvement, multiple sets of parameter values may be obtained using the above approach, and the parameter values are further optimized using an existing fitting method.

In step 1020, energy consumptions of the respective functional units of the respective virtual machines are calculated by multiplication according to the energy consumption coefficients and the event information mapped to the respective virtual machines. After the energy consumption coefficients are determined, energy consumptions of the respective functional units may be calculated, i.e., a*Xi, b*Yi, c*Zi, and d.

In step 1030, energy consumptions of the respective virtual machines are calculated by adding up energy consumptions of the respective functional units of the respective virtual machines. VM(i) energy consumption=a*Xi+b*Yi+c*Zi+d/n, wherein d is equally shared in this embodiment.

As the method of estimating virtual machine energy consumption of the present invention has been described with reference to the figures, an apparatus for estimating virtual machine energy consumption according to one embodiment of the present invention is described with reference to the figures. For the purpose of simplicity, part of details repeating the foregoing description are omitted in the following description. Hence, reference may be made to the foregoing description in order to obtain a more detailed understanding of the apparatus for estimating virtual machine energy consumption according to one embodiment of the present invention.

Figure 11:
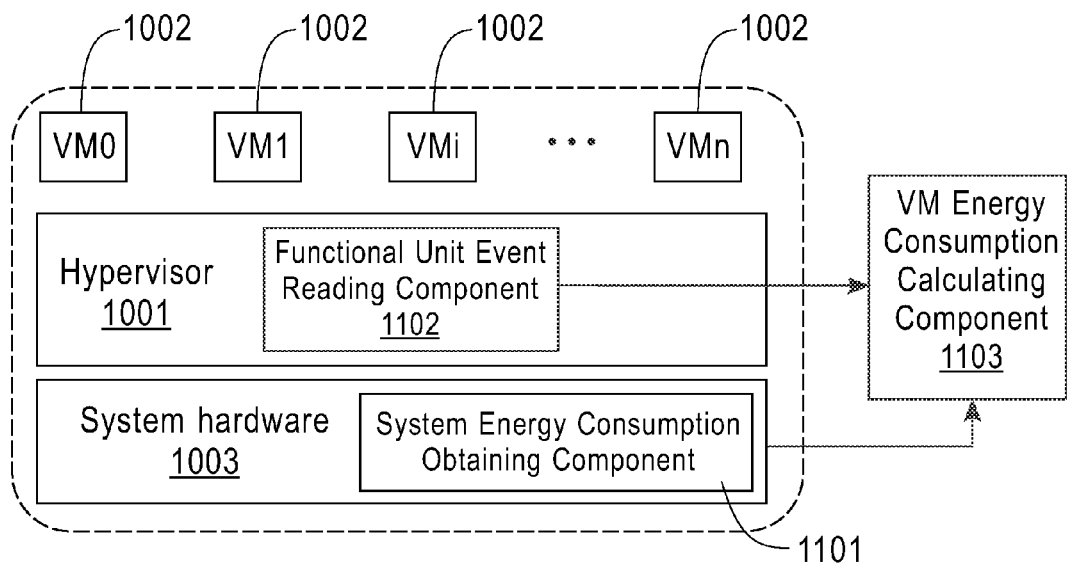
FIG. 11 is a schematic view of a computer system for estimating virtual machine energy consumption.

FIG. 11 illustrates an apparatus for estimating virtual machine energy consumption in a computer system. As illustrated in this figure, the computer system includes system hardware resources and a plurality of virtual machines. The apparatus includes:

A system energy consumption obtaining component 1101 configured to obtain system energy consumption of the system hardware resources.

A functional unit event reading component 1102 configured to obtain event information of a plurality of functional units into which the system hardware resources are divided, and map the event information to the respective virtual machines. In an improved embodiment, the functional units include CPU and at least one functional unit with higher energy consumption in the system hardware resources. The functional unit event reading component 1102 includes a component configured to, when the virtual machines are scheduled, read the CPU event information and map the read event information to the respective virtual machines. The functional unit event reading component 1102 may include the HPM reader illustrated in FIG. 12 for executing the flowcharts in FIGS. 3 and 4. The functional unit event reading component 1102 may further include the I/O throughput reader illustrated in FIG. 13 for executing the method steps in FIGS. 5 and 6. Hence, in an improved embodiment, the functional unit event reading component 1102 may include a component configured to, when the virtual machines are scheduled, read the Memory event information and map the read event information to the respective virtual machines; the functional unit event reading component 1102 may further include a component configured to, in response to a request for or a response to the I/O, read throughput data of the I/O request or response; or it may further include a component configured to obtain a virtual machine identification corresponding to the I/O request or response by mapping according to collected identification information in the I/O request or the I/O response information.

A virtual machine energy consumption calculating component 1103 configured to calculate energy consumption of the respective virtual machines according to a plurality of energy consumption coefficients corresponding to the plurality of functional units and according to the event information mapped to the functional units of the respective virtual machines.

Figure 12:
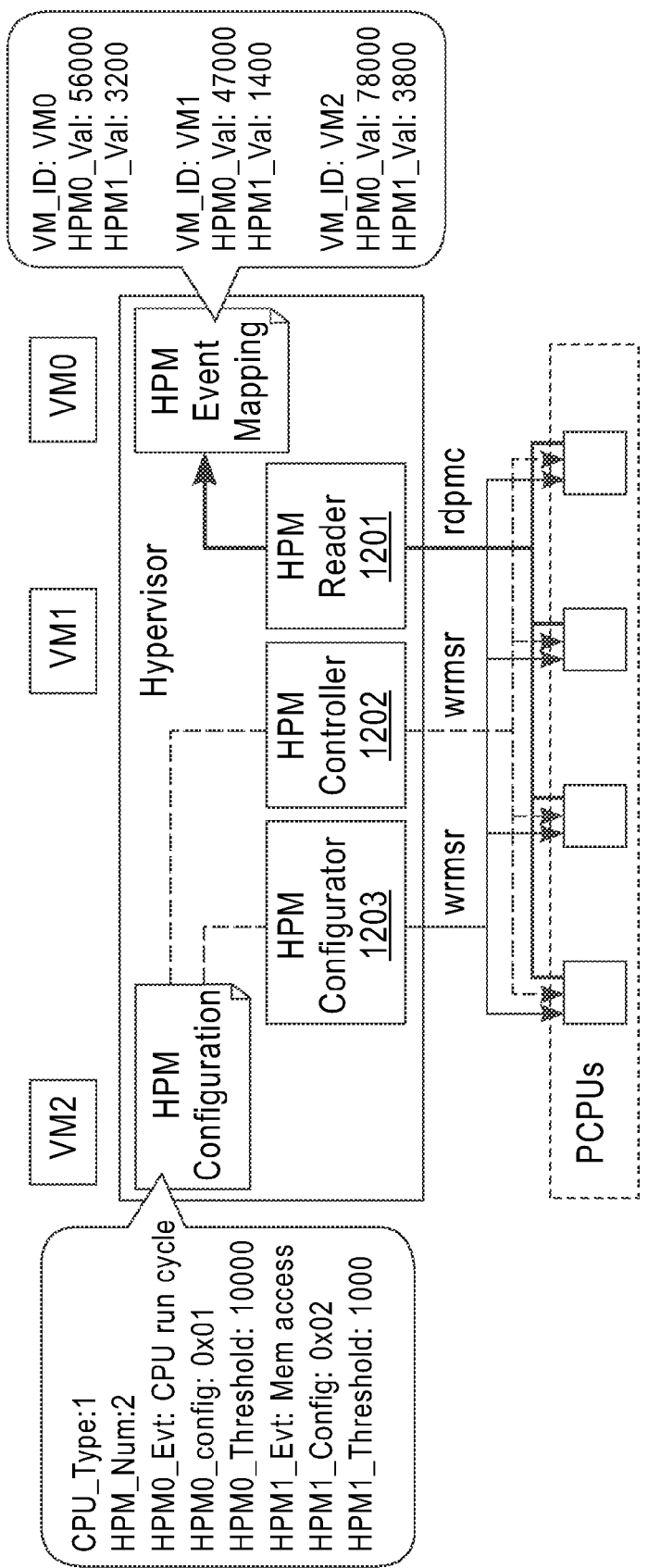
FIG. 12 is a concrete embodiment view of the system illustrated in FIG. 11.

Referring to FIG. 12, there is shown a further embodiment of the system illustrated in FIG. 11, including some detailed or optional components.

As shown in FIG. 12, an HPM reader 1201 may include a CPU event reader or a Memory event reader. In the embodiment illustrated in FIG. 12, data is read from an HPM register in PCPUs by using rdpmc in a reading channel; that is, HPM0_evt is a part of the HPM register.

Optionally, an HPM configurator 1202 is arranged in the hypervisor for executing the foregoing HPM configuring step. The HPM configurator may be arranged in the hypervisor, or in an alternative embodiment, the HPM configuring or control function is shifted into the virtual machine. In one embodiment, the HPM register may be configured using wrmsr in a configuring channel.

Optionally, a controller 1203 is included for controlling the HPM event collecting process or starting/stopping HPM data counting at the virtual machine runtime, and may be further used for reconfiguring the HPM control register. The controller 1203 may be arranged either in the hypervisor or in the virtual machine.

Figures 13, 14:
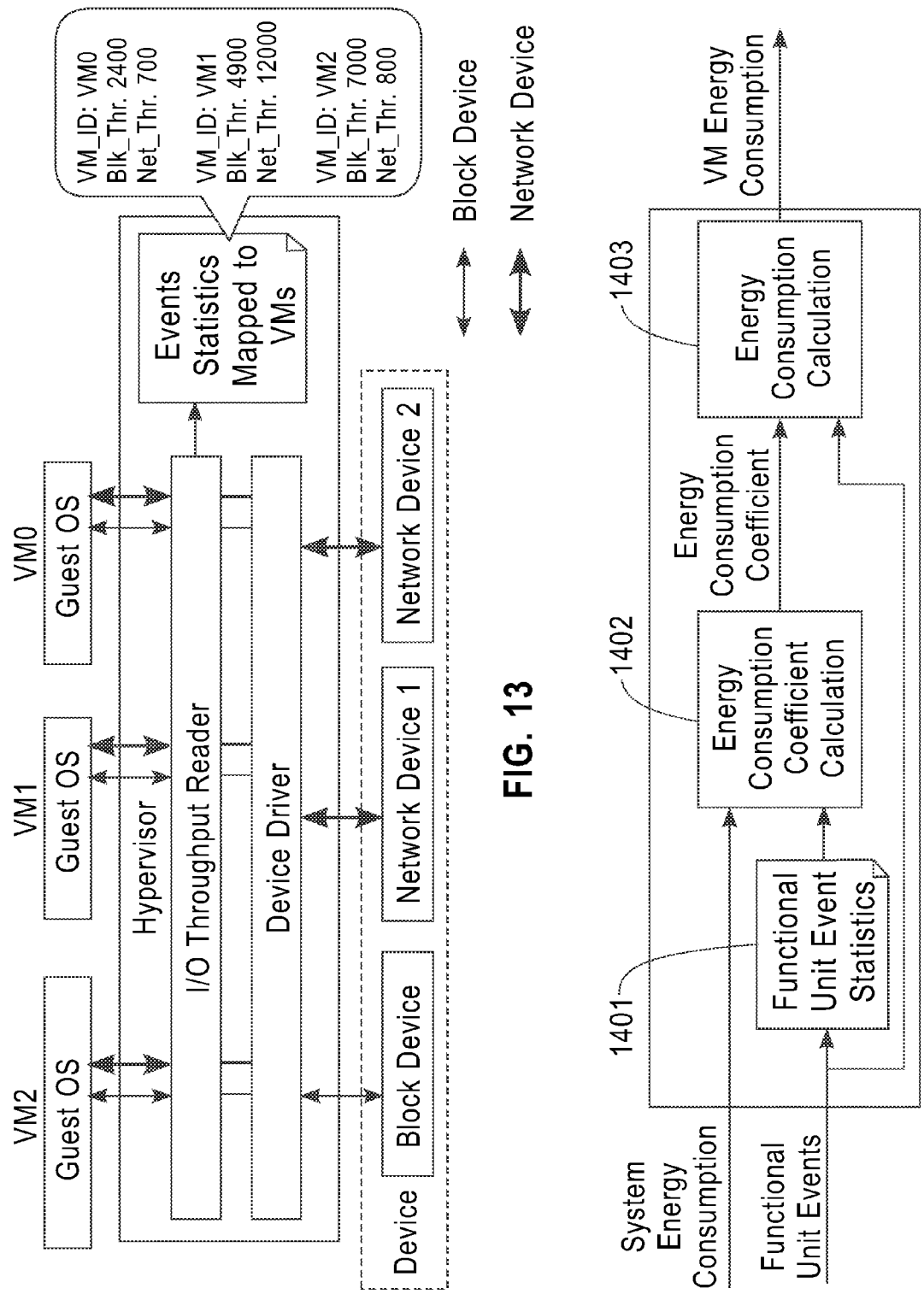
FIG. 13 illustrates an I/O throughput reader that may be included in a functional unit event reading component 1102.
FIG. 14 is a schematic view of an energy consumption calculating component 1103 according to one embodiment of the present invention.

Refer to FIG. 13, which illustrates an I/O throughput information reader that may be included in the functional unit event reading component 1102, the I/O throughput information reader being mainly used for executing the I/O throughput information obtaining step in FIGS. 5 and 6. In the embodiment illustrated in FIG. 13, the I/O throughput information reader maps the read I/O throughput information to the respective virtual machines. In an alternative component, the mapping may be implemented by other component.

FIG. 14 is a schematic view of the virtual machine energy consumption calculating component 1103 according to one embodiment of the present invention, for executing the method steps described in FIGS. 7-10 and the specification. The virtual machine energy consumption calculating component 1103 mainly includes the following:

A functional unit event statistics unit 1401 is used for making statistics of functional unit events. The functional unit event statistics unit 1401 provides a total value of functional unit event information according to functional unit events mapped to the virtual machines, and may also periodically provide a total value of multiple sets of functional unit event information. As an alternative embodiment, the event statistics unit 1401 itself may map functional unit events to the respective virtual machines.

An energy consumption coefficient calculating unit 1402 is used for calculating energy consumption coefficients. In one embodiment, a total value of functional unit event information provided by the statistics unit 1401 may be received, and energy consumption coefficients are calculated according to steps 7001 and 7002 illustrated in FIG. 7. In another embodiment, a total value of multiple sets of functional unit event information periodically provided by the statistics unit 1401 may be received, and energy consumption coefficients are calculated according to steps 1010 and 1020 illustrated in FIG. 10.

A virtual machine energy consumption calculating unit 1403 is used for receiving functional unit events mapped to the virtual machines and calculating energy consumptions of the respective virtual machines according to steps 7003 and 7004 illustrated in FIG. 7 or steps 1030 and 1040 illustrated in FIG. 10.

As an expanded embodiment of the present invention, the method and apparatus described above may be implemented in a cloud computing environment, wherein the system hardware resources include a plurality of cloud computing nodes, and a cloud computing consumer accesses the plurality of virtual machines by using a local computing device via a thin client interface. In particular, this virtual machine energy consumption estimation solution providing better accuracy over the prior art can provide a cloud computing environment with better measurable services and provide transparency for both service providers and consumers by monitoring, controlling and reporting resource usage.

However, it is to be understood that although the following disclosure includes a detailed description on cloud computing, the technical solutions recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: cloud computing capabilities are available over a network and accessed through standard mechanisms that promote use of cloud by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: computing resources can be rapidly and elastically provisioned, in some cases automatically, to quickly scale out and rapidly released to quickly scale in. To the consumer, the computing resources available for provisioning often appear to be unlimited and can be obtained in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting traffic sharing technology for load-balancing between clouds).

A cloud computing environment is service oriented with a focus on statelessness, low coupling, modularity, and semantic interoperability. At the heart of cloud computing is an infrastructure including a network of interconnected nodes.

Figure 15:
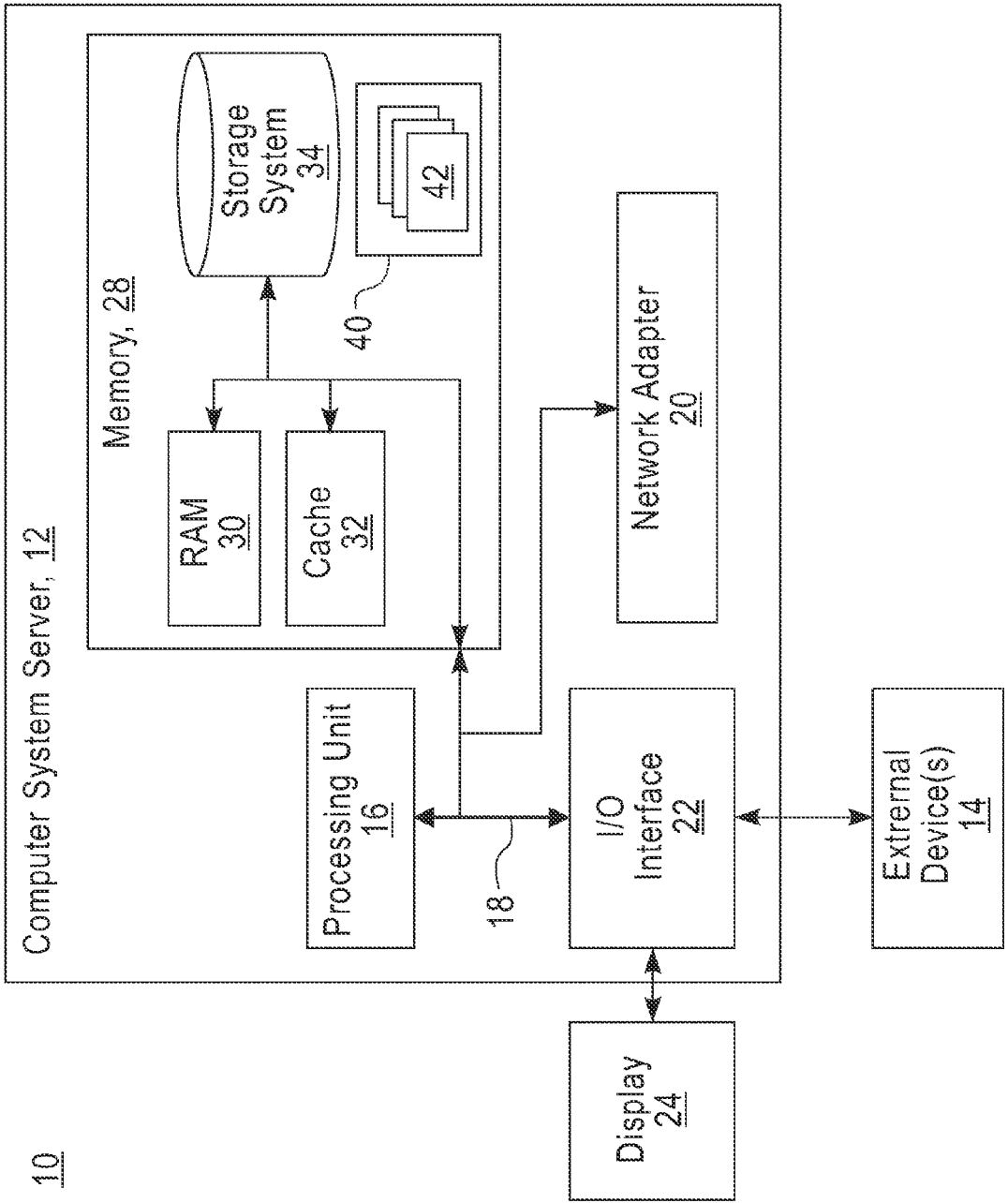
FIG. 15 illustrates a cloud computing node according to one embodiment of the present invention.

Referring now to FIG. 15, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 818 by one or more data media interfaces. As is further depicted and described below, memory 828 may include at least one program product having a set (e.g., at least one) of program modules that are configured to carry out the functions of embodiments of the present invention.

Program/utility 40, having a set (at least one) of program modules 42, may be stored in memory 28, such program modules 42 are by way of example, but not limited to, an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a wide area network (WAN), and/or a public network (e.g., the Internet) via network adapter 20. As depicted, network adapter 20 communicates with the other components of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

Figure 16:
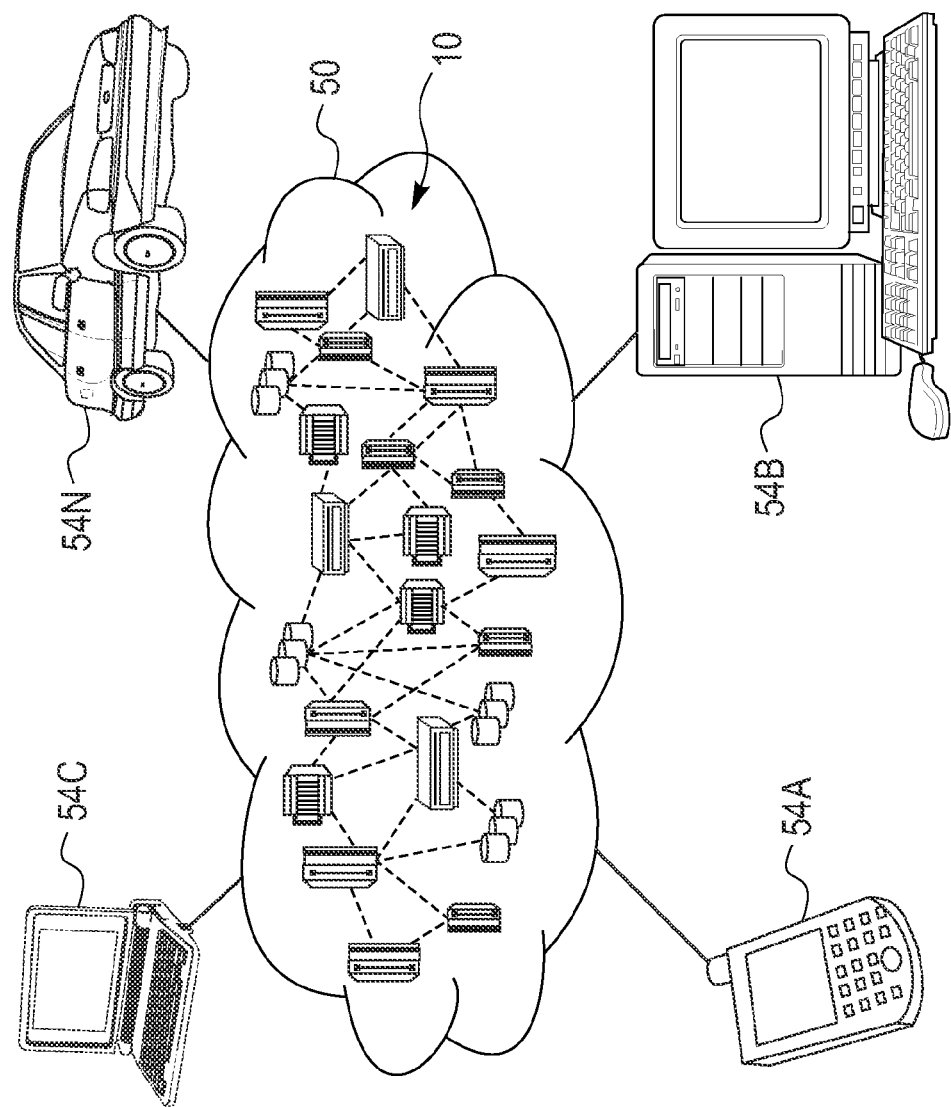
FIG. 16 illustrates a cloud computing environment according to one embodiment of the present invention.

Referring now to FIG. 16, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer can request without the need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
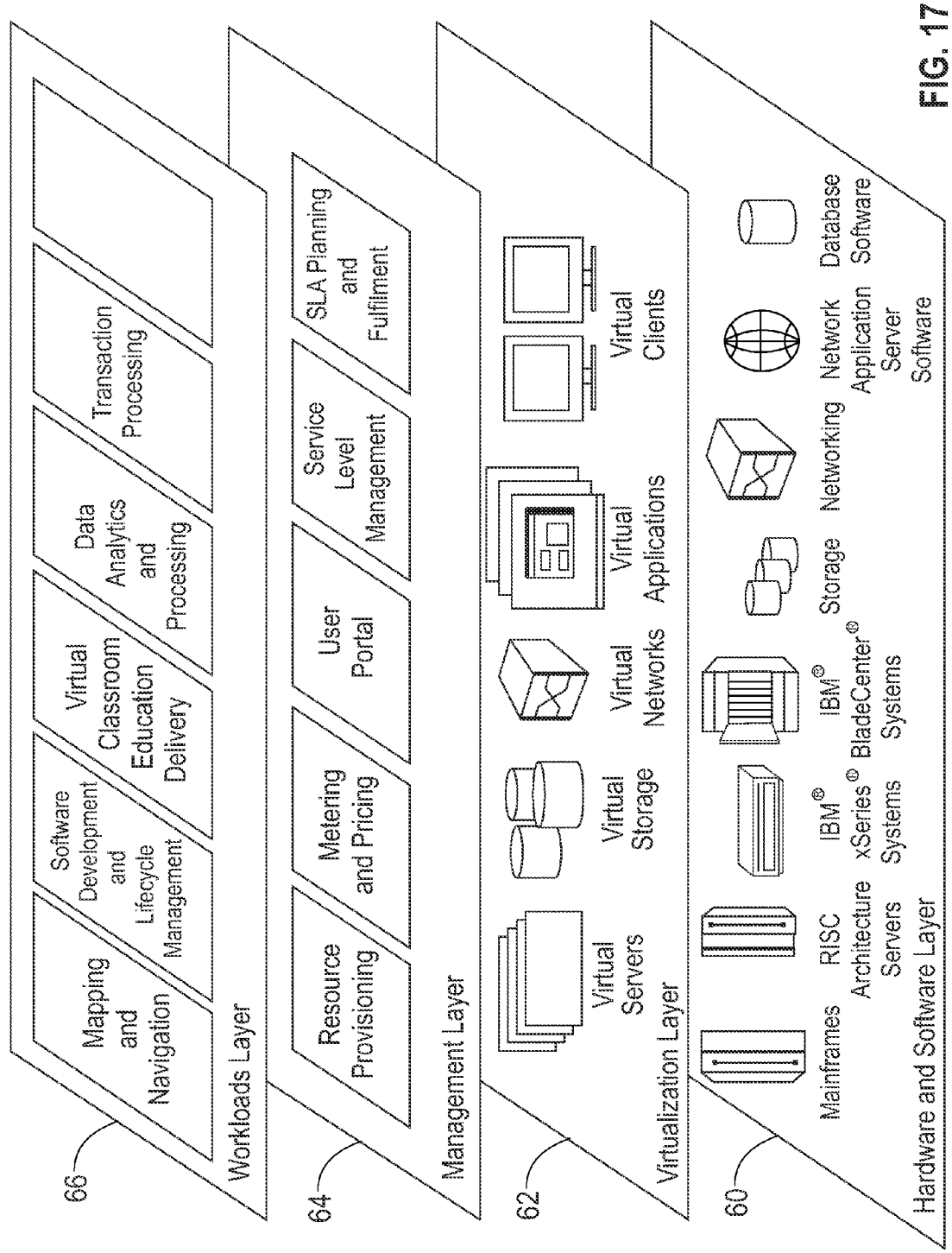
FIG. 17 illustrates abstraction model layers according to one embodiment of the present invention.

Referring now to FIG. 17, a set of functional abstraction layers provided by cloud computing environment 50 (FIG. 2) is shown. It should be understood in advance that the components, layers, and functions shown in FIG. 3 are intended to be illustrative only and embodiments of the present invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below: Resource provisioning provides dynamic procurement of computing resources and other resources that are utilized to perform tasks within the cloud computing environment (including the application testing of the present invention); Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop, etc.

The computer system for estimating virtual machine energy consumption according to embodiments of the present invention has been described with reference to the figures. It should be noted that the above description is only an example, but not intended for limiting the present invention. In other embodiments of the present invention, this method may have more, or less, or different steps, and the connection, inclusion, and functional relationship among the respective modules may differ from what is described and illustrated.

The present invention may be implemented by hardware, software, or combination of hardware and software. The present invention may be implemented in a computer system in a collective or distributed manner, where in the distributed manner, different parts are distributed in a plurality of interconnected computer system. Any computer system or other apparatuses suitable for implementing the method as depicted herein is suitable. A typical combination of hardware and software may be a universal compute system with a computer program which, when being loaded and executed, controls the computer system to implement the method of the present invention and constitute the apparatus of the present invention.

The present invention may also be embodied in a computer program product which includes all features capable of implementing the method as depicted herein and may implement the method when loaded to the computer system.

The present invention has been specifically illustrated and explained with reference to the preferred embodiments. Those skilled in the art will understand various changes thereto in form and details may be made without departing from the spirit and scope of the present invention.

What is claimed is:

1. A system for estimating virtual machine energy consumption in a computer system, the computer system comprising system hardware resources and a plurality of virtual machines, the system for estimating comprising:
 a system energy consumption component configured to obtain system energy consumption of the system hardware resources;
 a functional unit event reading component configured to obtain event information of a plurality of functional units into which the system hardware resources are divided, and map the event information to the respective virtual machines; and
 a virtual machine energy consumption calculating component configured to calculate energy consumption of the virtual machines according to a plurality of energy consumption coefficients corresponding to the plurality of functional units and according to the mapped event information, wherein the virtual machine energy consumption calculating component comprises:
 a component configured to obtain energy consumptions of the respective functional units in the system hardware resources according to predetermined energy consumption weights, the energy consumption weights being proportions of the energy consumptions of the respective functional units to the system energy consumption;

a component configured to determine the energy consumption coefficients by equally sharing the energy consumptions of the respective functional units according to a total amount of events obtained from the event information statistics of the functional units of the system hardware resources;

a component configured to calculate energy consumptions of the respective functional units of the respective virtual machines by multiplication according to the energy consumption coefficients and the event information mapped to the respective virtual machines; and a component configured to calculate energy consumptions of the respective virtual machines by adding up the energy consumptions of the functional units in the respective virtual machines.

2. The system for estimating according to claim 1, wherein the virtual machine energy consumption calculating component is further configured to allocate among the virtual machines energy consumptions of resulted functional units whose event information has not been obtained.

3. The system for estimating according to claim 1, wherein the virtual machine energy consumption calculating component is configured to retrieve corresponding energy consumption weights from predetermined multiple sets of the energy consumption weights according to a CPU utilization rate of the system hardware resources.

4. The system for estimating according to claim 1, wherein the virtual machine energy consumption calculating component comprises:

a component configured to periodically obtain multiple sets of the system energy consumptions and event information mapped to the functional units of the respective virtual machines, and further to calculate the plurality of energy consumption coefficients.

5. The system for estimating according to claim 1, wherein the functional units comprise a CPU and at least one functional unit with higher energy consumption in the system hardware resources, the system for estimating comprising:

a component for reading event information of the CPU, and mapping the event information to the respective virtual machines according to identification information in event information of the CPU.

6. The system for estimating according to claim 1, wherein the functional units comprise a storage unit, the system for estimating comprising:

a component for reading event information of the storage unit, and mapping the event information to the respective virtual machines according to identification information in event information of the storage unit.

7. The system for estimating according to claim 1, wherein the functional units comprise I/O which throughput information is obtained as event information of the I/O, the system for estimating comprising:

a component for, in response to a request for or a response to the I/O, reading throughput data of the I/O request or the I/O response; and a component for obtaining a virtual machine identification corresponding to the request or response by mapping according to collected identification information in the I/O request or the I/O response information.

8. The system for estimating according to claim 1, wherein the system hardware resources comprise a hardware performance monitor that is configured to register event information of the functional units.

9. The system for estimating according to claim 1, wherein the system hardware resources comprise a plurality of cloud computing nodes, and a cloud computing customer uses a local computing device to access the plurality of virtual machines via a thin client interface.

* * * * *